United States Patent [19]

Jego et al.

[11] Patent Number: 5,614,697
[45] Date of Patent: Mar. 25, 1997

[54] ELECTRICAL TRUNKING WITH WATERTIGHT COUPLING

[75] Inventors: Gerard Jego, Brazey En Plaine; Jean-Claude Lebeau, Varois; Philippe Normand, Chevigny; Daniel Nourry, Dijon; Jean-Pierre Thierry, Arc-Sur-Tille, all of France

[73] Assignee: Schneider Electric SA, Boulogne-Billancourt, France

[21] Appl. No.: 507,912

[22] Filed: Jul. 27, 1995

[30] Foreign Application Priority Data

Aug. 2, 1994 [FR] France .................................. 94 09677

[51] Int. Cl.⁶ ............................................................ H01R 4/26
[52] U.S. Cl. ............................................. 174/84 R; 174/91
[58] Field of Search ..................................... 174/41, 91, 101, 174/84 R; 439/210, 906, 143, 610, 794; 138/164; 285/121, 406

[56] References Cited

U.S. PATENT DOCUMENTS 3,562,402  2/1971  Dwyer ........................................ 174/35
3,570,546  3/1971  Jackson ..................................... 138/155
4,349,220  9/1982  Carroll et al. ........................... 285/121
4,486,620  12/1984  Ball et al. ................................ 174/41
4,818,824  4/1989  Dixit et al. ............................... 174/92
4,820,007  4/1989  Ross et al. ............................. 350/96.2
4,979,906  12/1990  Shrout et al. ......................... 439/213

FOREIGN PATENT DOCUMENTS 2647525  11/1990  France .

*Primary Examiner*—Kristine L. Kincaid
*Assistant Examiner*—Marc D. Machtinger
*Attorney, Agent, or Firm*—Oblon, Spivak, McClelland, Maier & Neustadt, P.C.

[57] ABSTRACT

Prefabricated electrical trunking made up of butt-jointed unit enclosure sections. A mechanical coupling is provided by use of flanges clamped by bolts passing through tubular spacers inside the enclosure sections. The spacers include openings receiving in a watertight manner swaged portions of orifices formed in the enclosure sections. A unit conductor assembly is housed in the coupling.

6 Claims, 2 Drawing Sheets 5,614,697

ELECTRICAL TRUNKING WITH WATERTIGHT COUPLING

BACKGROUND OF THE INVENTION

1. Field of the Invention

The present invention concerns prefabricated electrical trunking of the kind made up by butt-jointing unit enclosure sections each housing a unit conductor assembly comprising parallel electrical conductors.

2. Discussion of the Background

For fastening the envelope sections together, this type of trunking incorporates mechanical coupling usually comprising flanges adapted to cover the ends of the sections near the plane of the joint, the flanges being adapted to be clamped against the enclosure and/or to each other by screws or bolts passing through the enclosure walls.

It is essential to improve the quality of sealing in the coupling region to protect the electrical conductors and the members interconnecting them from the risk of ingress of water. From this point of view the fact that the bolts of the coupling pass through the trunking enclosure constitutes a problem.

SUMMARY OF THE INVENTION

An object of the invention is to provide simple means of sealing a coupling region in which bolted flanges are situated. Another object of the invention is to simplify in combination watertight passage of the bolts and the positioning of the conductors in the coupling region.

In accordance with the invention, in trunking of the type previously described, tubular spacers are disposed inside the enclosure, near the ends of the enclosure sections, for the coupling flange clamping screws to pass through, each spacer including at least one opening shaped to receive in a watertight manner the edge of a coaxial orifice in the enclosure.

In a preferred embodiment of the invention the opening is flared and the edge of the enclosure orifice is a force fit therein, for example by stamping or swaging it, without requiring a specific seal. The flared opening can also locate the corresponding flange.

The spacer is advantageously part of a support member for the conductors adapted to support and locate a conductor assembly or two symmetrically disposed conductor assemblies, with play and with limited axial movement.

BRIEF DESCRIPTION OF THE DRAWINGS

The following description with reference to the appended drawings is intended to explain the features of the invention and the results that can be achieved by use of the invention.

DESCRIPTION OF THE PREFERRED EMBODIMENTS

Figure 1:
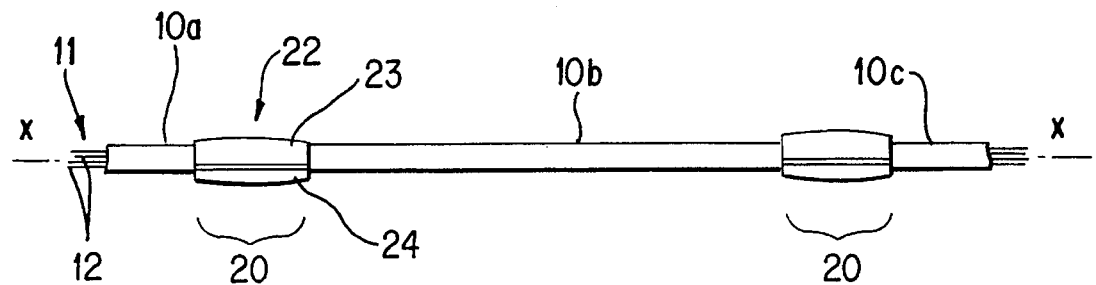
FIG. 1 is a view in side elevational view of prefabricated electrical distribution trunking.

The prefabricated electrical distribution trunking shown in FIG. 1 comprises a plurality of closed contour tubular enclosure sections 10a, 10b, 10c extending along a longitudinal axis X. Each enclosure section contains a conductor assembly 11 or two such assemblies, each of which comprises a plurality of parallel electrical power and possibly signal conductors 12; these conductors are busbars, separate cables or ribbon cables. The various enclosure sections 10 are butt jointed together at the ends using coupling devices 20; these interconnect the respective conductor assemblies and also provide a rigid mechanical coupling between the sections.

Figure 2:
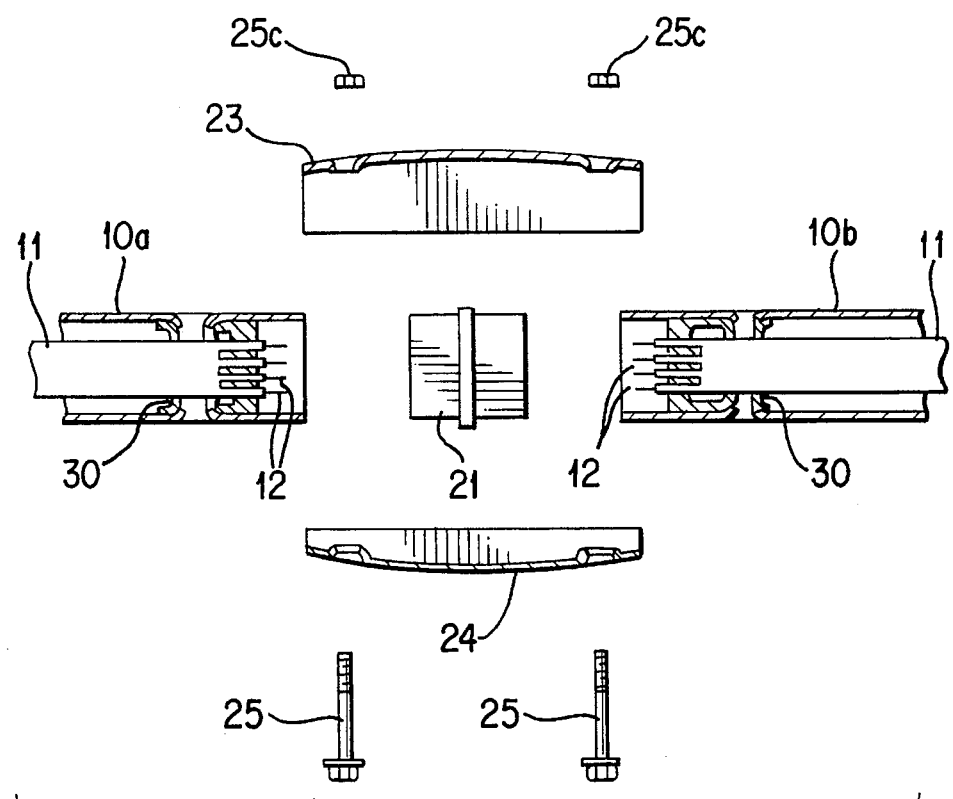
FIG. 2 is an exploded view of a coupling device in accordance with the invention.
Figure 3:
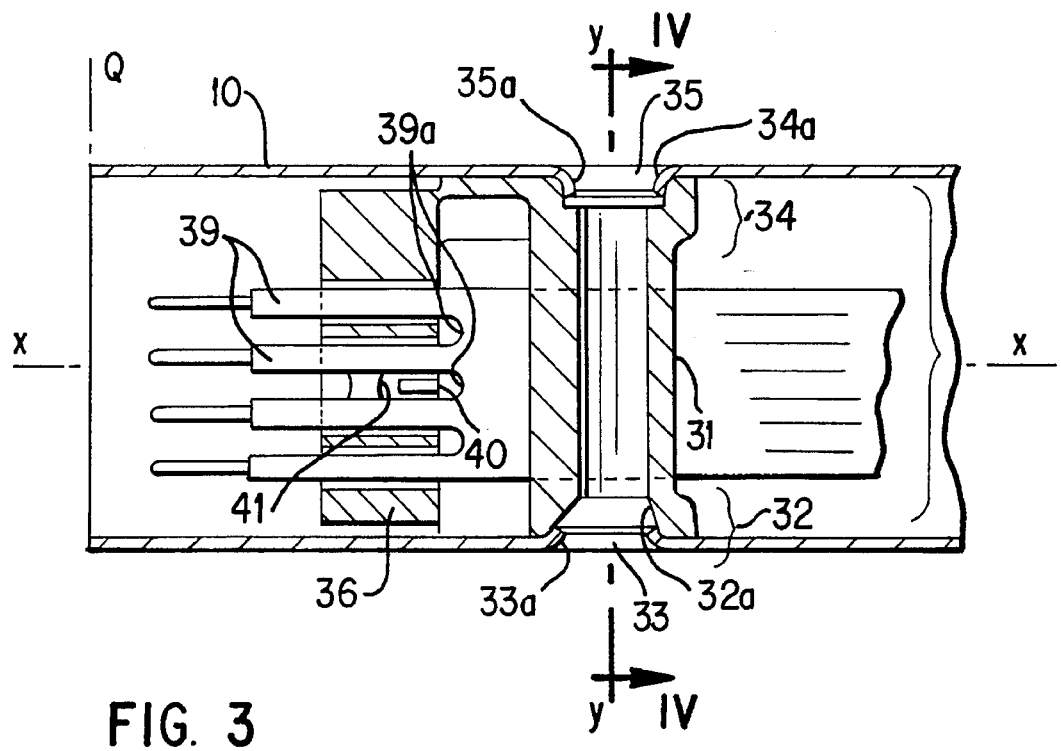
FIG. 3 is an elevational view on an enlarged, scale of the coupling region at the end of an enclosure section.

A coupling device 20 of this kind includes a member 21 (FIG. 2) containing contact bridges (not shown) for connecting the bared ends of the respective conductors 12 of the conductor assembly 11 in the enclosure sections 10a, 10b which may include ribbon cables to be joined together; the coupling device 20 further includes a member 22 for mechanical assembly of the sections designed to cover in a sealed manner the plane of the joint between the sections. This member comprises two flanges 23, 24, for example U-section flanges, clamped to the enclosure and fastened together by clamping bolts or other securing member 25. The coupling member 21 is associated with members (not shown) for making the insertion of this member into the ends of the enclosure sections watertight.

Cylindrical tubular spacers 30 are disposed vertically and the enclosure sections 10a, 10b, 10c, the spacers being located with their axis perpendicular to the longitudinal axis X of the trunking—inside the enclosure sections 10 and near the ends of the latter to provide a watertight passage for the clamping bolts 25.

Each spacer 30 has a tubular main part 31 opening to the exterior of the enclosure at its bottom end 32 and its top end 34. To this end the bottom end 32 has a flared, for example frustoconical, opening 32a into which the lip 33a of an orifice 33 in the bottom face of the enclosure is force fitted, for example crimped. The top end 34 of the spacer has a cylindrical opening 34a the diameter of which is greater than the inside diameter of the passage in the tubular part 31 to enable the lip 35a of an orifice 35 in the top face of the enclosure to be swaged into vertical alignment with this passage. A conical or other shaped portion 36a formed (e.g. stamped) at the edge of an orifice 36 in the bottom coupling flange 24 can be centered on the lip 33a in the bottom face of the enclosure. The top flange 23 also includes an orifice 37 so that the shank 25a of the clamping bolt 25 can be passed freely through the orifices 36, 33, the opening 32a, the tubular part 31, the opening 34a and the orifices 35, 37 until its head 25b abuts against the bottom flange 24, after which its nut 25c is tightened down onto the top flange 23. In this manner the assembly can be centered on the vertical axis Y of the orifice 33 in the bottom face of the enclosure.

Figure 4:
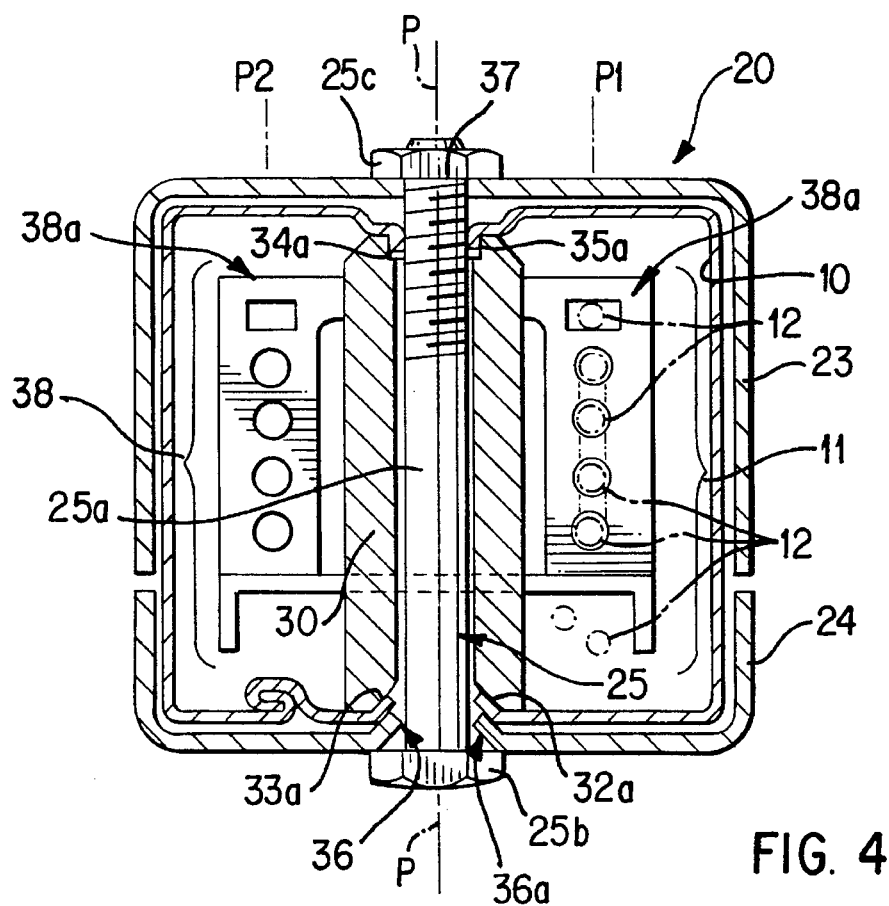
FIG. 4 is a cross-sectional view on an enlarged scale taken; along line IV—IV in FIG. 3.

The spacer is part of a plastics material support member 38 for the end of the conductor assembly 11 that is spaced from the plane Q of the joint between the enclosure sections 10; the support member includes, on two sides of the spacer (FIG. 4), two sets of openings 38a, one for each ribbon cable 11, aligned in respective planes P1, P2 parallel to the plane P and through which the conductors 12 pass. The ribbon cable is inserted into the support member with a small amount of axial play to suit the tolerances. To this end the sheathed parts of the ends of the conductors 12 are separated by gaps 39 delimited at the end by separate walls 39a of bilateral retaining members 40, 41 of the support member with appropriate clearances; this arrangement restricts axial movement of the ribbon cable during assembly of the trunking and electrical interconnection of the conductor sections.

The device of the invention makes the trunking more watertight in the coupling area and holds the ribbon cables in the required position.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A prefabricated electrical trunking assembled by butt jointing unit enclosure sections, each of the enclosure sections having an orifice formed therein and accommodating a unit conductor assembly having parallel electrical conductors, which comprises:

mechanical coupling devices having flanges covering end portions of the enclosure sections and securing members clamping the flanges together;

tubular spacers disposed inside the enclosure sections near the end portions of the enclosure sections, said spacers each having a longitudinal axis which is substantially perpendicular to a longitudinal axis of each enclosure section and extending substantially perpendicularly to the electrical conductor;

each spacer having at least one opening receiving in a watertight manner an edge of the orifice of each enclosure section wherein the orifice of each enclosure section is coaxial with the longitudinal axis of the spacer and wherein said clamping members are respectively positioned within said opening and each of said spacers, said clamping members extending perpendicularly with respect to the electrical conductors.

2. A trunking according to claim 1, wherein the at least one opening of the spacers is flared and, a lip of each of the enclosure sections is respectively force fitted in the flared opening of the spacer.

3. A prefabricated electrical trunking assembled by butt jointing unit enclosure sections, each of the enclosure sections having an orifice formed therein and accommodating a unit conductor assembly having parallel electrical conductors, which comprises:

mechanical coupling devices having flanges covering end portions of the enclosure sections and securing members clamping the flanges together;

tubular spacers disposed inside the enclosure sections near the end portions of the enclosure sections, each spacer having at least one opening receiving in a watertight manner an edge of the orifice of each enclosure section, wherein said at least one opening of each of the spacers is flared and a lip of each enclosure section is respectively force fitted in the flared opening of the spacer; and at least one of the flanges having an opening formed therein wherein the flared opening of one of the spacers centers a shaped portion formed at an edge of the orifice in said at least one of the flanes.

4. A trunking according to claim 1 which comprises at least one conductor assembly wherein each of the spacers is attached to a support member supporting the at least one conductor assembly wherein the support member is spaced from a joint where the enclosure sections abut one another.

5. A trunking according to claim 4 wherein the support member accommodates the conductor assembly with play and includes retaining members limiting axial displacement of the conductor assembly.

6. A prefabricated electrical trunking assembled by butt jointing unit enclosure sections, of the enclosure sections having an orifice formed therein and each accommodating a unit conductor assembly having parallel electrical conductors, which comprises:

mechanical coupling devices having flanges covering the end portions of the enclosure sections and a securing member clamping the flanges together;

tubular spacers disposed inside the enclosure sections near end portions of the enclosure sections;

each spacer having at least one opening receiving in a watertight manner an edge of the orifice of the enclosure sections; and at least one conductor assembly wherein each of the spacers is attached to a support member supporting the at least one conductor assembly at a position spaced from a plane of a joint where the enclosure sections abut one another;

wherein the spacers are each located in a median plane of the trunking and the at least one conductor assembly comprises two conductor assemblies which are symmetrically housed within the support member about the median plane.

* * * * *